H. G. LOOMIS.
Level.
No. 79,582.　　　　　　　　　　　　　Patented July 7, 1868.
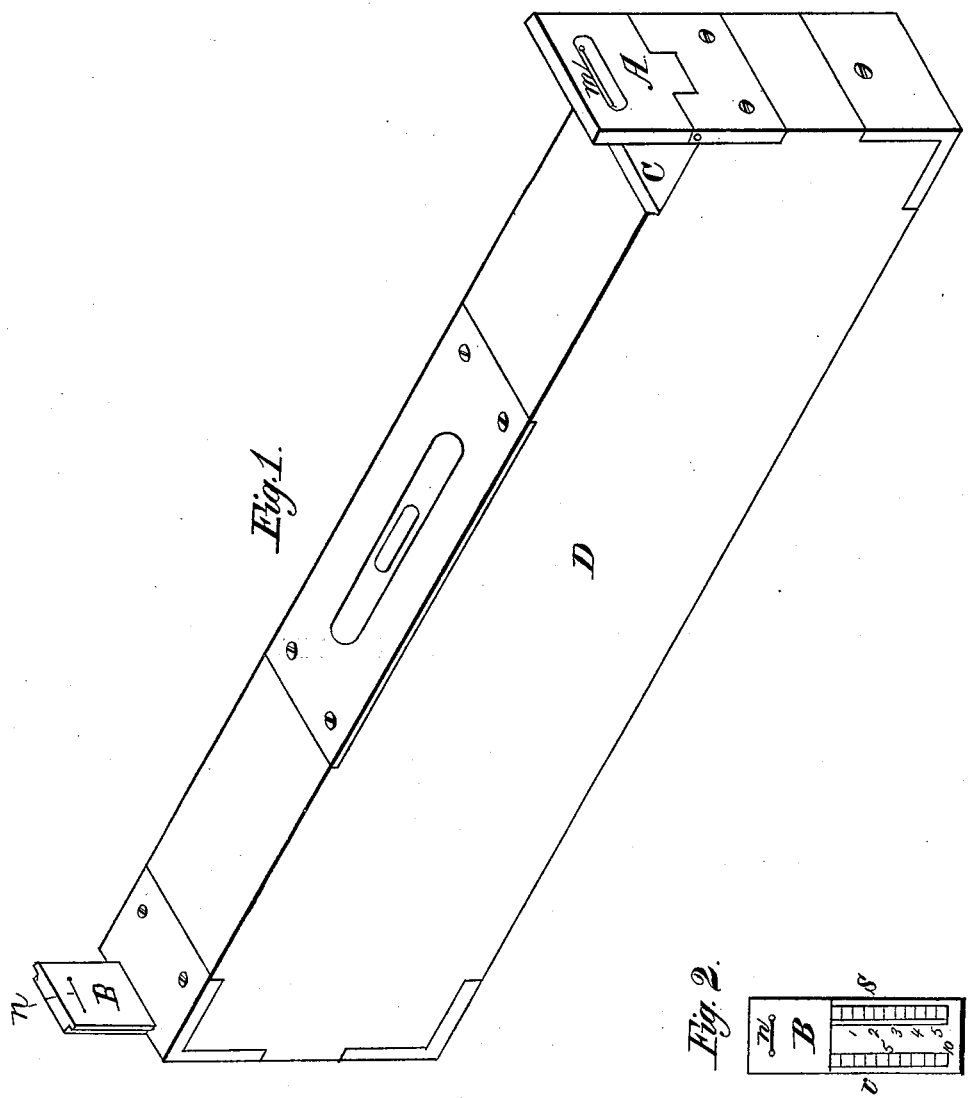
Witnesses:
Theo. G. Ellis.
Jno. L. Emerson
Inventor,
Hiram G. Loomis

United States Patent Office.

HIRAM G. LOOMIS, OF HARTFORD, CONNECTICUT.

Letters Patent No. 79,582, dated July 7, 1868.

IMPROVEMENT IN LEVELS.

The Schedule referred to in these Letters Patent and making part of the same.

TO ALL WHOM IT MAY CONCERN:

Be it known that I, HIRAM G. LOOMIS, of Hartford, in the county of Hartford, and State of Connecticut, have invented an Improved Level; and I do hereby declare that the following is a full, clear, and exact description of the construction and operation thereof, reference being had to the accompanying drawings, and to the letters of reference marked thereon.

Figure 1 is a perspective view of the improved level.

Figure 2 is a view of the slide B, showing the graduations.

My invention consists in providing an ordinary masons' level with sights at the ends of the frame, one of which can be raised and lowered, so that the sights will look in a line at a given inclination to a level line.

A is a folding leaf, furnished with a sight, $m$, and attached to one end of the level-frame D, which turns down so as to fill the space C when not in use. When used, it is turned up in the position shown in the drawings.

B is a slide, which is furnished with the sight $n$, and slides up and down in grooves in the end of the level-frame, so that it can be placed at any desired height. Upon this slide are marked scales, so that it can be set at such a height as will give a certain definite inclination to the sights $m$ and $n$, with regard to the level line of the base of the level-frame.

In the drawings these scales are shown on the inside face of the slide, but they may be placed upon the outside, if desired.

In fig. 2, at $r$, a scale is shown, the divisions of which correspond to a rise of one foot in a hundred, and at S is shown a scale of degrees of elevation. When the zero of either of these scales is brought in line with the top of the level-frame, the sights $m$ and $n$ look in a horizontal line. When any other division of the scale is brought to the same position, the line of sight is elevated above the level line to correspond with the inclination marked by that division.

When the leaf A is turned down and the slide B closed, the level presents the appearance of an ordinary masons' level, with no projections or parts to interfere with its use in the usual manner. My improved level is intended to be used for the purpose of an ordinary level, and also for the purpose of laying off and measuring inclinations and grades of roads, ditches, and other purposes.

Claim.

A carpenters' or masons' level, having a folding leaf, A, furnished with a sight, $m$, at one end of the frame, and at the other a graduated slide, B, furnished with a sight, $n$, sliding vertically in grooves, to adjust it to different elevations, substantially as herein described.

HIRAM G. LOOMIS.

Witnesses:
 THEO. G. ELLIS,
 JNO. L. EMERSON.